(12) United States Patent
Swierkowski (10) Patent No.: US 11,024,191 B2
(45) Date of Patent: Jun. 1, 2021

(54) SYSTEM FOR A MULTIMODAL EDUCATIONAL DISPLAY IN A POP-UP SCIENCE CENTER AND AN EDUCATIONAL METHOD FOR A MULTIMODAL EDUCATIONAL DISPLAY IN A POP-UP SCIENCE CENTER

(71) Applicant: Kujawsko-Pomorski Klaster Brewstera, Torun (PL)

(72) Inventor: Jan Mikolaj Swierkowski, Torun (PL)

(73) Assignee: Kujawsko-Pomorski Klaster Brewstera, Torun (PL)

( * ) Notice: Subject to any disclaimer, the term of this patent is extended or adjusted under 35 U.S.C. 154(b) by 329 days.

(21) Appl. No.: 16/282,382

(22) Filed: Feb. 22, 2019

(65) Prior Publication Data
US 2020/0273360 A1 Aug. 27, 2020

(51) Int. Cl.
*G09B 5/06* (2006.01)
*G09B 23/00* (2006.01)
*G09B 5/12* (2006.01)

(52) U.S. Cl.
CPC ............ *G09B 5/067* (2013.01); *G09B 5/065* (2013.01); *G09B 5/125* (2013.01); *G09B 23/00* (2013.01)

(58) Field of Classification Search
CPC . G09B 5/067; G09B 5/08; G09B 5/06; G09B 5/02; G09B 5/00
See application file for complete search history.

(56) References Cited

U.S. PATENT DOCUMENTS

| 5,929,848 A * | 7/1999 | Albukerk ................. G09B 5/06 715/700 |
| 9,375,652 B2 | 6/2016 | Willett |
| 2006/0188230 A1* | 8/2006 | An ....................... G09B 29/008 386/227 |
| 2007/0256017 A1* | 11/2007 | Nishimura ............. G06Q 50/00 715/730 |
| 2008/0218307 A1* | 9/2008 | Schoettle ............ H04L 12/2829 340/3.1 |
| 2014/0288714 A1* | 9/2014 | Poivet .................... G05B 15/02 700/275 |
| 2016/0011733 A1* | 1/2016 | Mann .................... G06F 3/0484 715/709 |
| 2016/0327403 A1* | 11/2016 | Chang ................ G06Q 30/0282 |

(Continued)

OTHER PUBLICATIONS

Wikipedia "Stellar evolution." https://en.wikipedia.org/wiki/Stellar_evolution, retrieved Feb. 21, 2019, 15 pages.

*Primary Examiner* — Justin S Lee
(74) *Attorney, Agent, or Firm* — Ziegler IP Law Group, LLC (57) ABSTRACT

A system for a multimodal educational display, including a wireless network of sensors and actuators connected to a control system, wherein the control system is configured to gather information through said sensors, analyse data and control the multimodal display by providing action through said actuators based on measurable features of a group of people visiting the multimodal display, said actions being provided in a way that facilitates immediate understanding of an abstract concept from natural sciences and establishes new mental bindings that stimulate the imagination. The invention is further related to an educational method for a multimodal educational display realized in such a system.

11 Claims, 5 Drawing Sheets

(56) References Cited

U.S. PATENT DOCUMENTS

| | | | |
|---|---|---|---|
| 2017/0153787 A1* | 6/2017 | Chowdhary | G06F 3/04815 |
| 2018/0025668 A1* | 1/2018 | Mase | G09F 13/22 |
| | | | 434/286 |
| 2020/0082604 A1* | 3/2020 | Kim | G06T 15/20 |

* cited by examiner

SYSTEM FOR A MULTIMODAL EDUCATIONAL DISPLAY IN A POP-UP SCIENCE CENTER AND AN EDUCATIONAL METHOD FOR A MULTIMODAL EDUCATIONAL DISPLAY IN A POP-UP SCIENCE CENTER

TECHNICAL FIELD

The aspects of the disclosed embodiments refer to the application of apparatus and networking approaches to astronomy museums, visitor centers, and public observatories which offer educational exhibits and/or historical artifact displays. The aspects of the disclosed embodiments propose a wireless network of sensors and actuators connected to a control system, that allows to dynamically relate certain features of a group of visitors (i.e. the overall mass or density in a particular space) with the presented educational content. Based on the data gathered by the sensors an analysis by the control system is provided which allows modifying the exhibition through the actuators in a way that facilitates understanding and creation of new mental bindings.

BACKGROUND

Astronomy museums, visitor centers, and public observatories are often located in remote areas (or outside the city centers) due to the nature of the astronomical inquiry which requires most often dark sky or a certain level of radio silence. The examples include the Maunakea Observatories in Hawaii, Lisbon Astronomical Observatory, Centre for Astronomy at Nicolaus Copernicus University in Toruń, and many more. In such places, there is no economic justification to sustain an exhibition opened on a daily basis for single visitors. However due to a growth of astrotourism such educational spaces often receive large guided groups of visitors at prescheduled hours. Unfortunately even this requires the museum to hire someone on a daily basis as a guide and the content of the exhibitions rarely meets the promise of unveiling the mysteries of the Cosmos. There is a need to implement a control system that creates interactivity in such places in a way that benefits from the fact that viewers come mostly in large groups at scheduled visits, substitutes the explanatory role of a trained physical guide, and stimulates education.

SUMMARY

The inventor has a large experience in creating multimodal exhibitions for public institutions, science centers, and festivals which cover topics from natural sciences and portray them through displays built according to a methodology engraved in cognitive metaphor theory. The exhibitions consist of multiple spaces in which educational displays are presented in the form of a multisensory experience that allows for instant cognition in various symbolic systems at one time (i.e. film, music, painting, photography, sculpture, architecture, dance, performance, and live-act). The displays are multimodal spatial cognitive metaphors. One display may consist of maximum 9 different modes of communication written language, spoken language, static and moving images, music, non-verbal sound, smell, taste, touch, and gestures. Each display is supported by technological devices i.e. sound systems, LED and stroboscopic lights, projectors, smoke machines. The goal of each display is to provoke a multisensory understanding of an abstract concept described by a natural science i.e. astronomy, physics chemistry or biology at a human scale.

Figure 1:
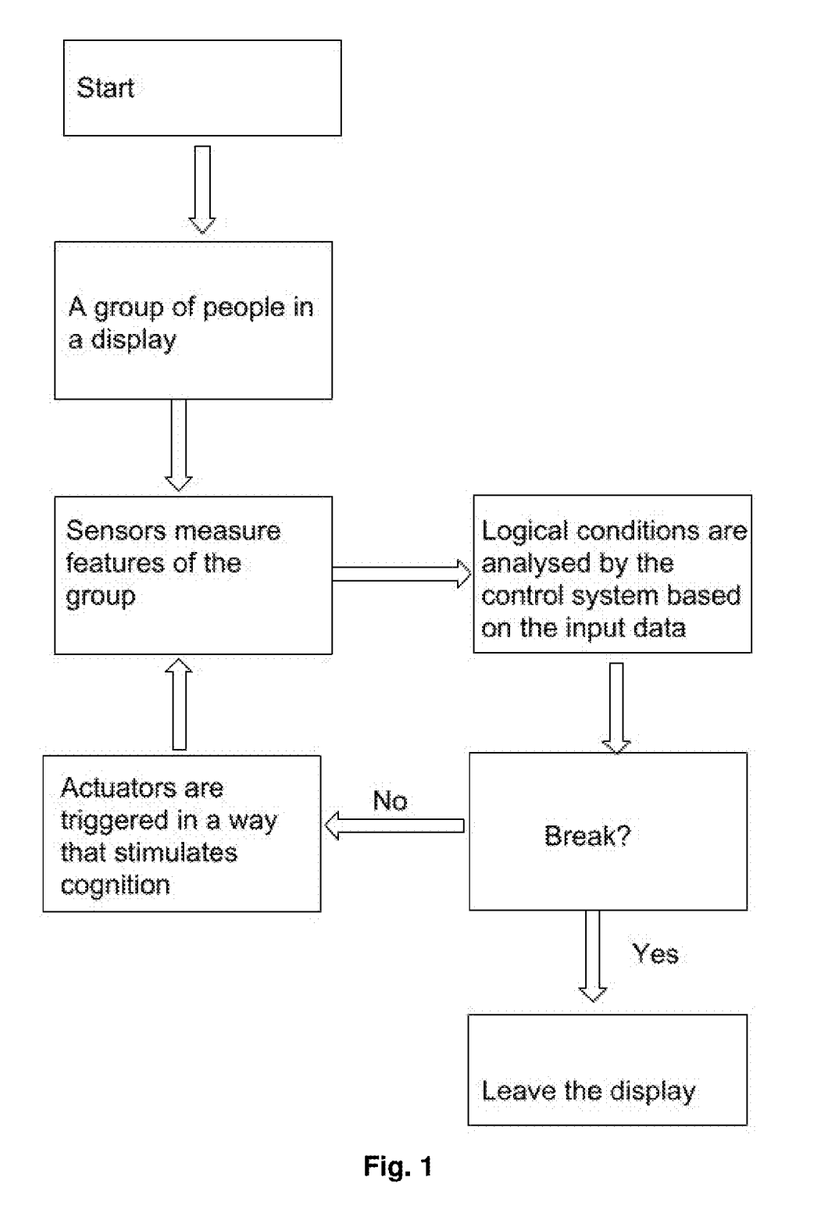
FIG. 1 presents the general concept of the control system, actuators, and sensors that stimulate cognition.

The Inventor proposes a wireless network of sensors and actuators connected to a control system, that is able to analyze data and control a multimodal display in a remote museum (i.e. visitor center or an astronomy museum) based on measurable features of a visiting group (i.e. the overall mass of the group, density in the exhibition room, loudness etc.). The control system gathers information (through sensors) and provides action (through actuators) in a way that facilitates immediate understanding of an abstract concept from natural sciences and establishes new mental bindings that stimulate the imagination. The action is repeated ad infinitum unless a break actuator is triggered (FIG. 1).

The educational methodology of the invention benefits from recent developments in cognitive sciences which prove that when natural scientists solve complicated problems in order to understand the unknown they often rely on cognitive metaphors. In this sense the essence of 'a cognitive metaphor' is to understand an 'unknown thing' (i.e. an electron) in terms of a 'well-known thing' (i.e. a planetary system). This fact can be used in education processes, especially in natural sciences which are abundant in abstract concepts that are 'out of this world' and can't be understood through direct cognition (i.e. electrons are too small to be seen, stars are too far to be touched). The invention allows to control interactive displays based on metaphors that create such first-hand experience with the unknown (how does it feel to be in a core of a star?). In order to create an educational exhibit based on cognitive metaphor theory the inventor identifies the key features of an abstract concept (up to 4 features), embeds them in a physical object (audio-visual installation, sculpture etc.) or an experience (performance, live-act, gig etc.), and stimulates the interaction with key features. The proposed invention allows to control the embedded cognitive features in exhibits based on the measured actions of a group of visitors.

It is thus the object of the present disclosure to provide a system and a method for use in a multimodal educational display, such as a multimodal pop-up science center, for facilitating immediate understanding of an abstract concept from natural sciences and establishing new mental bindings that stimulate the imagination of a visitor of said display.

A system for a multimodal educational display, according to the aspects of the disclosed embodiments, comprise a wireless network of sensors and actuators connected to a control system, wherein the control system is configured to gather information through said sensors, analyse data and control the multimodal display by providing action through said actuators based on measurable features of a group of people visiting the multimodal display, said actions being provided in a way that facilitates immediate understanding of an abstract concept from natural sciences and establishes new mental bindings that stimulate the imagination.

Preferably, said sensors include any of the following: a sensor for measuring the mass density in a given space (i.e. density per $m^3$), a sensor for measuring the overall weight of the group of visitors in a given space (i.e. pressure per $m^2$), a sensor for measuring the position of a single visitor, a GPS sensor, a Bluetooth sensor, a sensors for measuring loudness in a given space.

Preferably, said actuators are configured to use two or more of the following modes of communication: written language, spoken language, static images, moving images, music, non-verbal sound, smell, taste, touch, gestures.

Preferably, said actuators include any of the following: a sound system, a LED light source, a stroboscopic light source, a beam light source, a projector, a smoke machine, a heat blower, a confetti cannon.

Preferably, said sensors and actuators are located in a remote place, eg. a visitor center or an astronomy museum.

Preferably, said measurable features of the group of people visiting the multimodal display include any of the following: the overall mass of the group, density in the exhibition room, loudness.

Preferably, the system has communication means configured for exchanging data between the control system and sensors and actuators of a first display and between the control system and sensors and actuators of a second display, wherein the control system is configured such that data obtained from the sensors of the first display influences the actuators of the second display.

Preferably, the system comprises the following actuators mounted in a room:

four stroboscopic lights fixed on the minimum height of 3 m,
four moving beam lights fixed in the corners of the room on the minimum height of 3 m, one quadrophonic audio system, four technical par 64 lights fixed in fixed in the corners of the room on the minimum height of 2 m, two remote controlled confetti cannons with violet (400 nm) confetti or similar material, two remote controlled confetti cannons with red (665 nm) confetti or similar material, two heat blowers, and the following sensors mounted in the room:
a sensor for measuring the density in a given space in a circle drawn on the floor of the room, a sensor for measuring the overall weight of a group of visitors in the circle, a sensor for measuring the position of a single visitor, a sensors for measuring loudness in the room.

The aspects of the disclosed embodiments also comprise an educational method for a multimodal educational display, realized in a system as defined above, relating to the scientific concept of a Main Sequence Star, comprising the following steps:
a) Once a GPS sensor confirms that a group of visitors has entered a room—an audio message is played via a quadrophonic audio system about the scientific concept of a Main Sequence Star and an instruction how to activate the display;
b) Once an appropriate sensor, utilizing the value of the speed of a sound wave, confirms that a predefined critical density inside a circle drawn on the floor of the room, which represents the core of a star, has been reached by the group—technical lights are turned off, heat blowers are turned on and an audio message is played with further instructions;
c) If the density created by the group inside the circle drops beneath a predefined value—the heat blowers and the quadrophonic audio system are deactivated one after another;
d) If the density created by the group inside the circle sustained after a predefined time—an energetic music is played from the quadrophonic system and stroboscopic lights and beam lights are activated;
e) If the measured overall mass in the circle is lower than a predefined value than violet (400 nm) confetti canons are activated;
f) If the measured overall mass in the circle is higher than a predefined value then red confetti canons are activated, kept active for a maximum of 20 s, after which the installation is deactivated;
wherein the group has a predefined time to activate the red (665 nm) confetti canon.

Preferably, the inventive system and the inventive method are realized in a Pop-up science center.

BRIEF DESCRIPTION OF THE DRAWINGS

Preferred embodiments of the present disclosure are presented in a more detailed way with reference to the attached drawing, in which.

DETAILED DESCRIPTION

Preferred embodiments of the present disclosure are described in details below. The examples serve only as an illustration and do not limit the scope of the present disclosure.

EXAMPLE 1

Main Sequence Star

An embodiment of the present disclosure may be implemented in an educational display about the Main Sequence Star, which is a star that synthesizes hydrogen into helium in its core. For this processes to occur high density of hydrogen particles is needed which effects also in high temperatures (high kinetic energy). During this process light (photon emission) is being produced and even more heat. Depending on the number of particles (mass) gathered by a star one of the following types of nuclear fusion will be dominant: proton-proton reactions or CNO cycle. The educational objective of the invention is therefore to correlate density, heat, mass and nuclear fusion with the concept of a core of a star.

Figure 2:
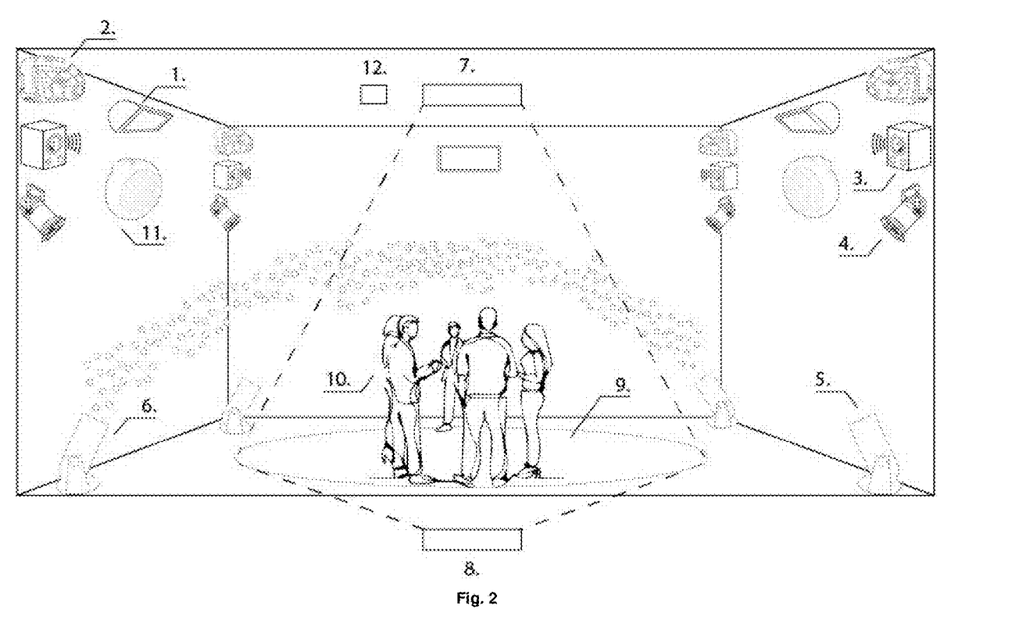
FIG. 2 shows main Sequence Star display.

A spatial cognitive metaphor that allows for an understanding of the concept of a Main Sequence Star is a display set in a cubic space with single digit dimensions (i.e. width=5 m, depth=4 m, height=4 m) (FIG. 2). There is a circle (9) lit (or drawn) on the floor which imitates the core of a star (diameter=2,5 m). The display includes a set of wireless actuators:
a) 4 stroboscopic lights (i.e. 1000 W) fixed on the minimum height of 3 m (1)
b) 4 moving beam lights (i.e. 189 W) fixed in the corners on the minimum height of 3 m (2)
c) 1 quadrophonic audio system (3)
d) 4 technical par 64 lights fixed in in the corners on the minimum height of 2 m (4)
e) 2 remote controlled confetti cannons with violet (400 nm) confetti or similar material (5)—such devices are known eg. from the U.S. Pat. No. 9,375,652
f) 2 remote controlled confetti cannons with red (665 nm) confetti or similar material (6)
g) 2 electrical heat blowers (i.e. 2000 w) (11)
and wireless sensors:
a) a sensor that measures the density in a given space in the circle (i.e. density per $m^3$) (7)
b) a sensor that measures the overall weight of a group of visitors in the circle (i.e. pressure per $m^2$) (8)

c) a sensor that measures the position of a single visitor (i.e. GPS)
d) a sensors that measures loudness (12)

The actuators are activated by given measurements provided by sensors in a way that imitates the production of light in the core of a star. There are two main cognitive programs that can be activated by a group of visitors that correlate with two types of light production processes in a star (the proton-proton process or CNO). The sensors and actuators are connected to a control system that may be implemented as a computer. Based on the analysis of the data obtained by sensors, the control system triggers actuators.

Figure 3:
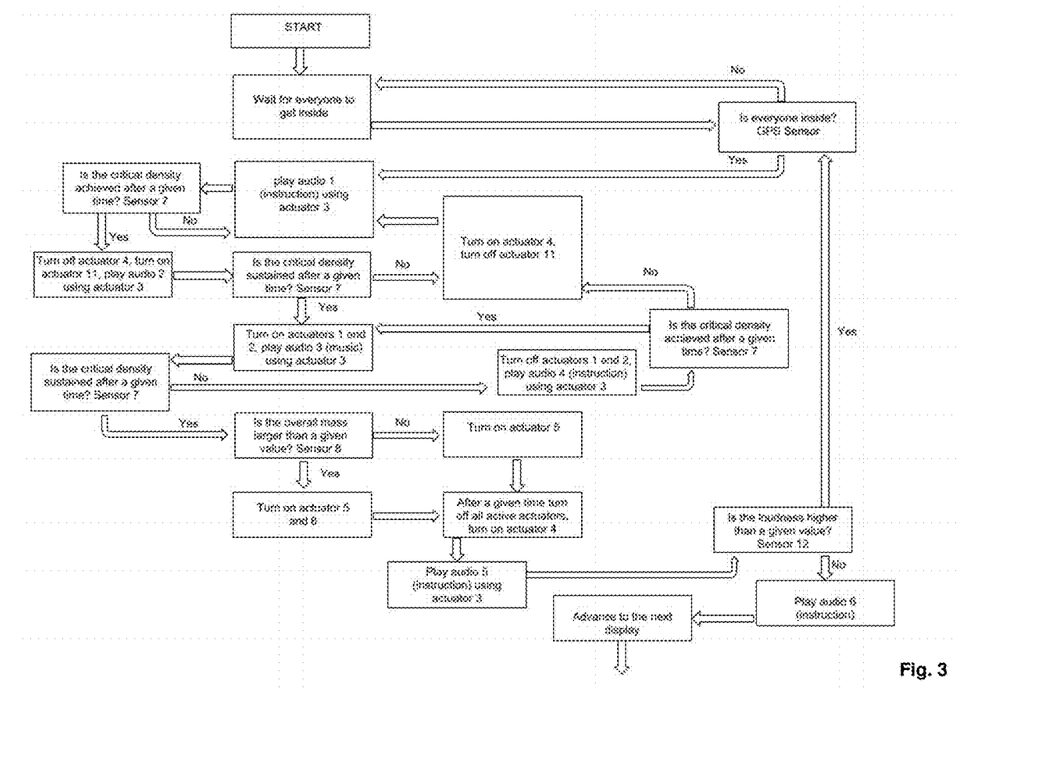
FIG. 3 presents the block scheme of the Main Sequence Star display.
Figure 4:
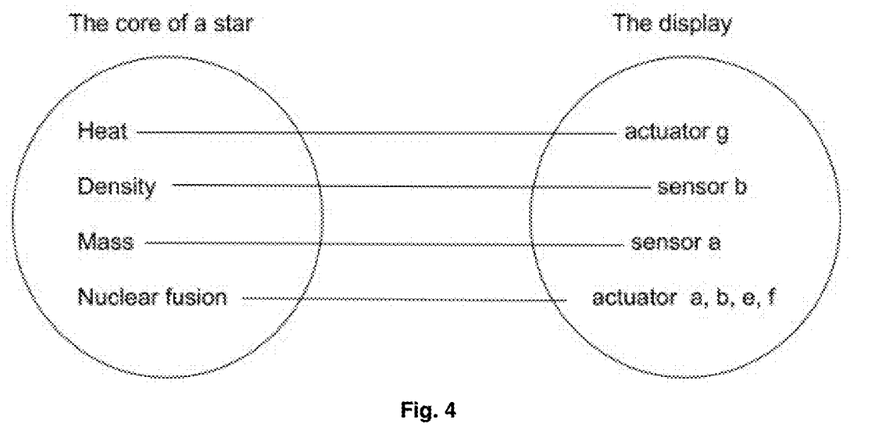
FIG. 4 shows the creation and stimulation of cognitive bindings in the Main Sequence Star display based on identified 4 key features of the core of a star.

Once the group (10) enters space (measured i.e. by a GPS sensor) an audio message is played (via 3) about the scientific concept of a Main Sequence Star and an instruction how to activate the display. The first goal of the group is to reach a preset critical density (i.e. 1 person/per m$^2$) inside of the circle (which represents the core of a star) in the center of the room in order to activate a given sequence of the actuators triggered by the control system which imitates a process of nuclear fusion. Once the critical density is achieved (measured i.e. by the value of the speed of a sound wave or the amount of people in the circle) the technical lights (4) are turned off (the color of the technical lights is fixed to green color=550 nm), the heat blowers are turned on (11) and an audio message is played with further instructions. The density created by the visitors is measured all the time by the density sensor (7). If the density in the core drops beneath a given value (at least below the average level of 90% of the initial value per 10 seconds)the actuators are deactivated one after another (i.e. one per 10 seconds). If the density is sustained (above 90% of the initial value) after a given time (at least 30 seconds). energetic music starts to play from the quadrophonic system (3) and the control system triggers stroboscopic (blueish color=495 nm) and beam lights (orange color=630 nm). If the measured overall mass in the circle is lower than a set value (i.e. lower than 1000 kg) than violet (400 nm) confetti canons are activated (5). If the overall mass in the circle is higher than a given value (i.e. higher than 1000 kg) also red (665 nm) confetti canons are activated (6). The combination of moving confetti (paper cuts etc.) and flickering of the stroboscopic light (frequency=8-10 Hz) creates a physical phenomenon called afterimages observed by the group, which resemble random photon emission and absorption in a star. The group has a set time (i.e. 3 minutes) to activate the red confetti canon. If the red cannon is activated the program will run for a maximum of 30 s, after which the installation is deactivated. The procedure described in this paragraph is illustrated in FIG. 3, while the corresponding cognitive bindings are presented schematically in FIG. 4.

EXAMPLE 2

Main Sequence Star

Figure 5:
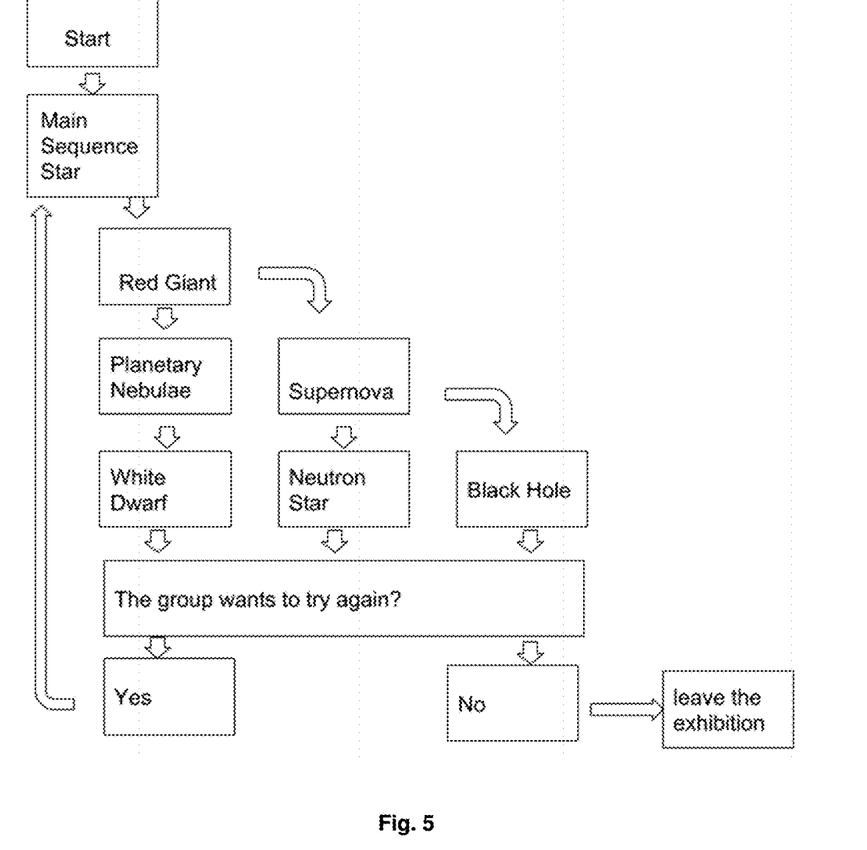
FIG. 5 presents the system of connected displays that cover the topic the stellar evolution.

The Main Sequence Star display may be implemented as a singular display or become a part of a system of connected displays i.e. about the stellar evolution which are another embodiments of the present disclosure. According to Wikipedia (https://en.wikipedia.org/wiki/Stellar_evolution): "The stellar evolution is the process by which a star changes over the course of time. Depending on the mass of the star, its lifetime can range from a few million years for the most massive to trillions of years for the least massive, which is considerably longer than the age of the universe. It is not studied by observing the life of a single star, as most stellar changes occur too slowly to be detected, even over many centuries. Instead, astrophysicists come to understand how stars evolve by observing numerous stars at various points in their lifetime, and by simulating stellar structure using computer models." Consequently, according to the invention, each display may have its own sensors and actuators connected to the control system that stimulates cognition in a group of visitors. Data gathered from sensors from one display once analyzed by the control system may influence actuators in other displays i.e. by choosing a different educational path for a group of visitors. In example the measurement of the overall mass of a group of visitors in the Main Sequence Star display (8) may affect the Red Giant display directing the group to the Planetary Nebulae or Supernova display (as shown in FIG. 5) based on the sensor indications. So, in a preferred embodiment of the present disclosure, the control system according to the present disclosure covers interactions between different displays.

The invention claimed is:

1. A system for a multimodal educational display, comprising:
   a wireless network of sensors and actuators connected to a control system, wherein the control system is configured to gather information through said sensors, analyse data and control the multimodal display by providing action through said actuators based on measurable features of a group of people visiting the multimodal display, said actions being provided in a way that facilitates immediate understanding of an abstract concept from natural sciences and establishes new mental bindings that stimulate the imagination; and wherein the system further comprises the following actuators and sensors mounted in a room:
   four stroboscopic lights fixed at a minimum height of 3 meters;
   four moving beam lights fixed in corners of the room at the minimum height of 3 meters;
   one quadrophonic audio system;
   four technical par 64 lights fixed in corners of the room at a minimum height of 2 meters;
   two remote controlled confetti cannons with violet confetti material;
   two remote controlled confetti cannons with red confetti material;
   two heat blowers;
   a sensor for measuring a density in a given space in a circle drawn on a floor of the room;
   a sensor for measuring an overall weight of the group of people in the circle;
   a sensor for measuring a position of a single person of the group of people; and
   a sensor for measuring loudness in the room.

2. The system according to claim 1, wherein said sensors include one or more of the following: a sensor for measuring mass density in a given space, a sensor for measuring overall weight of the group of people in the given space, a sensor for measuring the position of a single visitor in the given space, a GPS sensor, a Bluetooth sensor and a sensor for measuring loudness in the given space.

3. The system according to claim 1, wherein said actuators are configured to use two or more of the following modes of communication: written language, spoken language, static images, moving images, music, non-verbal sound, smell, taste, touch and gestures.

4. The system according to claim 1, wherein said actuators include any of the following: a sound system, a LED light source, a stroboscopic light source, a beam light source, a projector, a smoke machine, a heat blower and a confetti cannon.

5. The system according to claim 1, wherein said sensors and actuators are located in a remote place.

6. The system according to claim 1, wherein said measurable features of the group of people visiting the multimodal display include any of the following: an overall mass of the group of people, a density in an exhibition room and loudness.

7. The system according to claim 1, further comprising communication means configured for exchanging data between the control system and sensors and actuators of a first display and between the control system and sensors and actuators of a second display, wherein the control system is configured such that data obtained from the sensors of the first display influences the actuators of the second display.

8. The system according to claim 1, implemented in a Pop-up science center.

9. An educational method for a multimodal educational display, realized in a system according to claim 1, relating to the scientific concept of a Main Sequence Star, comprising the following steps:
   a) Once a GPS sensor confirms that a group of visitors has entered a room, an audio message is played via a quadrophonic audio system about a scientific concept of a Main Sequence Star and an instruction how to activate the display;
   b) Once a sensor, utilizing a value of a speed of a sound wave, confirms that a predefined critical density inside a circle drawn on a floor of the room, which represents a core of a star, has been reached by the group of visitors, technical lights are turned off, heat blowers are turned on and an audio message is played with further instructions;
   c) If the density created by the group of visitors inside the circle drops beneath a predefined value, the heat blowers and the quadrophonic audio system are deactivated one after another;
   d) If the density created by the group of visitors inside the circle is sustained after a predefined time, an energetic music is played from the quadrophonic system and stroboscopic lights and beam lights are activated;
   e) If a measured overall mass in the circle is lower than a predefined value, violet confetti cannons are activated;
   f) If the measured overall mass in the circle is higher than a predefined value, red confetti cannons are activated and kept active for a maximum of 20 seconds, after which the red confetti cannons are deactivated;
   wherein the group of visitors has a predefined time to activate the red confetti cannons.

10. The method according to claim 9, implemented in a Pop-up science center.

11. The system according to claim 5 wherein the remote place comprises one or more of a visitor center or an astronomy museum.

* * * * *